United States Patent
Moeller et al.

(10) Patent No.: US 10,788,314 B2
(45) Date of Patent: Sep. 29, 2020

(54) OBJECT POSITION INDEPENDENT METHOD TO MEASURE THE THICKNESS OF COATINGS DEPOSITED ON CURVED OBJECTS MOVING AT HIGH RATES

(71) Applicant: Arkema Inc., King of Prussia, PA (US)

(72) Inventors: Gunter E. Moeller, Collegeville, PA (US); Roman Y. Korotkov, King of Prussia, PA (US); Ryan C. Smith, Schwenksville, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 16/065,837

(22) PCT Filed: Jan. 4, 2017

(86) PCT No.: PCT/US2017/012087
§ 371 (c)(1),
(2) Date: Jun. 25, 2018

(87) PCT Pub. No.: WO2017/120161
PCT Pub. Date: Jul. 13, 2017

(65) Prior Publication Data
US 2019/0011251 A1   Jan. 10, 2019

Related U.S. Application Data

(60) Provisional application No. 62/275,912, filed on Jan. 7, 2016.

(51) Int. Cl.
*G01B 11/06* (2006.01)
*G01N 21/84* (2006.01)
(Continued)

(52) U.S. Cl.
CPC ........ *G01B 11/0633* (2013.01); *G01B 11/026* (2013.01); *G01B 11/0691* (2013.01);
(Continued)

(58) Field of Classification Search
CPC ............ G01B 11/0633; G01B 11/0691; G01B 21/06; G01B 11/026; G01B 11/0616;
(Continued)

(56) References Cited

U.S. PATENT DOCUMENTS 3,328,593 A * 6/1967 Johnson ............. G01N 21/9072
356/388
4,461,576 A    7/1984 King
(Continued)

FOREIGN PATENT DOCUMENTS

EP    0 443 322 A2    8/1991
EP    0 443 322 A3    8/1991
(Continued)

OTHER PUBLICATIONS https://www.keyence.com/products/sensor/photoelectric/cz-v20/applications/ RGB Digital Fiberoptic Sensors CZ-V20 Series Keyence America pp. 1-5.

*Primary Examiner* — Michael P LaPage
(74) *Attorney, Agent, or Firm* — Lynn B. Morreale

(57) ABSTRACT

Methods and apparatus for measuring a thickness of a coating on an moving object are provided. Light is directed toward the object at a predetermined location on the object such that a portion of the light interacts with the object. A I D and/or 2D maximum intensities for at least one wavelength channel is captured that is produced by the portion of the light interacting with the object. A measured average intensity of the wavelength channel and/or intensities and their arithmetic derivatives of multi wavelength channel geometries is converted into I D (averaged) and/or 2D thickness values. Based on these values an acceptability of the coating is evaluated and thickness calculated.

18 Claims, 16 Drawing Sheets

(51) Int. Cl.
*G01B 11/02* (2006.01)
*G01B 21/06* (2006.01)
*G01N 21/25* (2006.01)
*G01N 21/90* (2006.01)

(52) U.S. Cl.
CPC ........... G01B 21/06 (2013.01); G01N 21/255 (2013.01); G01N 21/8422 (2013.01); G01N 21/9054 (2013.01); G01N 2021/8427 (2013.01)

(58) Field of Classification Search
CPC ............. G01N 21/255; G01N 21/8422; G01N 21/9054; G01N 2021/8427
See application file for complete search history.

(56) References Cited

U.S. PATENT DOCUMENTS

| | | |
|---|---|---|
| 4,651,568 A | 3/1987 | Reich et al. |
| 5,208,645 A | 5/1993 | Inoue et al. |
| 5,396,080 A | 3/1995 | Hannotiau et al. |
| 5,619,330 A | 4/1997 | Ehemann, Jr. et al. |
| 5,991,018 A | 11/1999 | Imaizumi et al. |
| 6,252,237 B1 | 6/2001 | Ramthun et al. |
| 6,515,293 B1 | 2/2003 | Jun et al. |
| 6,646,752 B2 | 11/2003 | Chen et al. |
| 7,365,860 B2 | 4/2008 | Price |
| 7,414,470 B2 | 8/2008 | Okazaki |
| 7,414,740 B2 | 8/2008 | Wilke et al. |
| 2003/0230719 A1 | 12/2003 | Shelly et al. |
| 2004/0065841 A1 | 4/2004 | Darr et al. |
| 2004/0239919 A1* | 12/2004 | Schwarz ............... G01N 21/57 356/237.2 |
| 2009/0039240 A1 | 2/2009 | Van Nijnatten |
| 2009/0148031 A1 | 6/2009 | Fukami |
| 2010/0033735 A1 | 2/2010 | Sakai et al. |
| 2012/0097835 A1* | 4/2012 | Sharonov ........... G02B 21/0032 250/201.3 |
| 2013/0095577 A1 | 4/2013 | Milshtein |
| 2013/0222575 A1 | 8/2013 | Numazu |
| 2014/0119634 A1 | 5/2014 | Numazu |
| 2015/0076353 A1* | 3/2015 | Bathelet ............... B07C 5/3408 250/340 |
| 2015/0316475 A1* | 11/2015 | Rahman ............... G01N 21/9501 250/339.02 |

FOREIGN PATENT DOCUMENTS

| | | |
|---|---|---|
| WO | WO 2004/065902 A1 | 8/2004 |
| WO | WO 2012/078886 A2 | 6/2012 |

* cited by examiner

Transparent Glass bottle

FIG. 3A
FIG. 3B
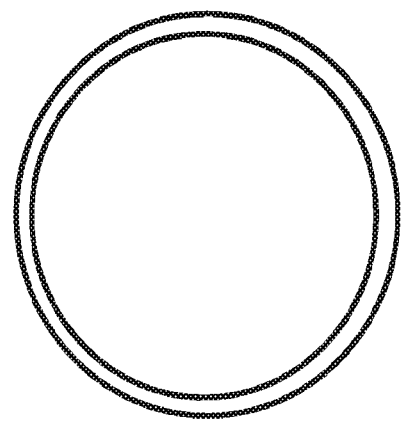
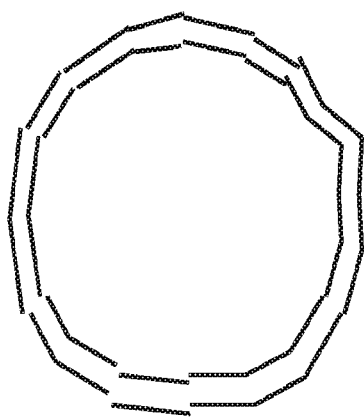
FIG. 4
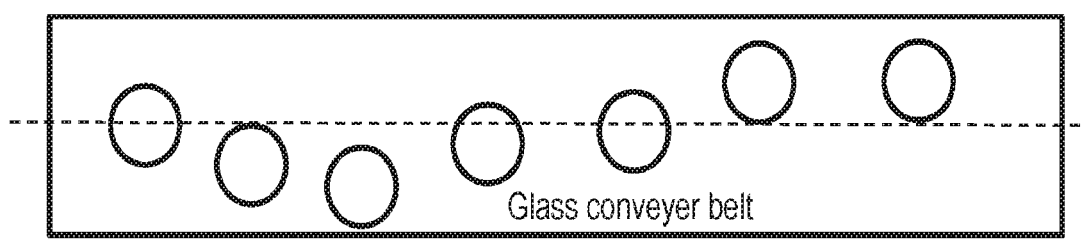

R, G, B and 325 nm wavelength channel intensities for non-polarized excitation light source at zero deg incidence.

Blue (454nm) wavelength channel intensities for p-Polarized incident light.

Measured Blue (454 nm) wavelength channel intensity as a function of coating thickness.

Measured Blue (454 nm)/Red (663nm) wavelength channel Intensity ratio as a function of coating thickness.

OBJECT POSITION INDEPENDENT METHOD TO MEASURE THE THICKNESS OF COATINGS DEPOSITED ON CURVED OBJECTS MOVING AT HIGH RATES

CROSS-REFERENCE TO RELATED APPLICATIONS

This application is a national stage application under 35 U.S.C. § 371 of PCT/US2017/012087 filed Jan. 4, 2017, which claims benefit to U.S. patent application Ser. No. 62/275,912, filed Jan. 7, 2016.

FIELD OF THE INVENTION

The present invention relates to methods and apparatus for optically measuring a thickness of a coating deposited on a moving container during on-line productions.

BACKGROUND OF THE INVENTION

During a glass container forming process, a metal-oxide coating is typically applied to the exterior of the glass container. Such coatings, which include tin, titanium, or other reactive metallic compounds, or organometallic compounds, may be employed to protect the glass container from surface damage, such as abrasions and scratches, which result in a loss of tensile strength for the glass container. High tensile strength in a glass container is desirable, particularly when containers are mass produced, move rapidly in close proximity along high speed conveyor lines, are filled with carbonated beverages, foodstuffs, etc. that produce gaseous pressure within the container and are shipped.

The metal-oxide coating is typically applied when the glass container emerges in a heated, fully shaped condition from a glassware forming machine that is at the "hot end" of the system. The containers are transported away from the forming machine by a conveyor. Temperatures in excess of 400 degrees Centigrade exist at the surface of the glass containers, so that when a heat decomposable inorganic metallic, or organometallic, compound is applied thereto, the compound reacts immediately and is converted to a metal-oxide coating.

It is desirable for the coating to be periodically inspected during the glass forming process. Current quality inspection procedures typically involve an offline process. One or more containers are periodically pulled from the production line, after the container has cooled down to less than about 100 degrees Centigrade (at the "cold end" of the system). The thickness of the metal-oxide coating is then measured to determine whether the thickness is within a thickness tolerance range. If the thickness is outside the tolerance range, additional containers produced since the last successful inspection must be inspected to determine when the process drifted out of specification and off-specification containers may be destroyed. For example, sample containers may be inspected every 4 to 8 hours. If there are about 400 to 500 bottles being formed per minute (or about 25,000 to about 55,000 bottles per hour), a coating deficiency identified after four hours of production may result in a significant loss of inventory. It is also important to note that the difference between the pass and fail thickness value may be as little as 5 CTU, depending on the manufacturer specification (CTU=coating thickness unit, 1 nm equals approximately 3.45 CTU). Therefore, a highly reproducible extra-sensitive technique is needed for bottle production process.

Various methods exist for detecting defects in objects to be inspected.

U.S. Pat. No. 4,651,568 is directed to a glass bottle inspection method and apparatus that uses an acoustic wave pulse to detect defects. Acoustic wave distance and defect measurement apparatus are limited first by the effective coupling of the acoustic wave and second by the object dimensions. The last limitation is directly related to forming well resolved pulse. This drawback limits acoustic wave detection of coating thickness on solid objects to above 0.1 mm, wherever as thickness precision below 5 nm may be required.

WO 2004/065902 is directed to a method and apparatus for contactless measurement of a coating on a substrate such as a bottle, based on capturing ultraviolet (UV) radiation reflected from the container surface. This system is limited to the UV region of the spectrum because it depends on the absorption properties of glass below about 350 nm, demonstrated by transmission spectrum for transparent flint glass in FIG. 1. For wavelength below 320 nm, glass generally transmits no more than approximately 10% of incident light. Referring to FIG. 2, for a cylindrical glass container multiple reflections are possible: (1) at outer surface of first glass "wall", which may be coated; (2) at the inner surface of the first "wall", (3) at the inner surface of the opposite "wall" of the container; and (4) at the outer surface of the opposite "wall" of the glass container. Because of the low transmittance below 320 nm, reflections 2-4 will be very weak and may be ignored, allowing consideration of only reflection from the first interface. But for wavelengths greater than 320 nm, all four main scattering rays will be combined in the reflection optics. Only mechanism 1 is directly correlated to the thickness of the coating at the $1^{st}$ interface. The rest contribute to noise level of the measurement system. The noise level will be increased because glass containers are not perfect cylinders; in fact, most glass containers can be described by n-polygons in cross-section, as shown in FIG. 3A-B. This fact complicates the analysis of the reflected light. Thus, the method described in application WO 2004/065902 is limited to UV, where most of the signals resulting from secondary surfaces can be ignored due to strong absorption; and would only be truly effective for wavelength near 320 nm or below. Building an optical setup at 320 nm is quite costly and requires some special optics, detectors and light sources. One other limitation of the method is the distance dependence for the measurement demonstrated by the authors. Under normal production conditions, containers are rarely aligned perfectly at the center of the conveyer belt. Just the opposite, the bottles may vary by a few inches in either direction perpendicular to the center line, FIG. 4. This inconsistency will lead to considerable variation in the distance between the container and any measurement device positioned near the conveyor. The distance variation will lead to further increase in the noise level that must be accounted for by either additional positioning systems or complex calibrations in the thickness measurements. In addition, in the claims of the invention, the authors rely heavily on the out-coupling and coupling of the excitation and reflected beams into optical fibers. We have measured temperatures in excess of 70° C. at the thickness measurement points, making most fiber coupling unusable due to epoxy failure in the fiber.

U.S. Publication No. 2009039240 is modified technique to measure thickness using UV excitation source and reflected light collected using an integrating sphere. This approach is costly and is difficult to implement due to the size of the integrating sphere. Most of the adhesives used in production of reflection surface (PTFE, Spectralon©, etc.) in integrating spheres start failing above 70° C., making it unusable in the Bottle glass plant environment. In addition, integrating spheres are used as a steady state devices due to long persistent transient responses and measured signal 'pulsed stretching' caused by the multiple diffused reflections. At the same time, typical 600 bottles/min glass production plants may require detection times below 5 msec. This approach is also expected to be affected by variable distance between containers and the measurement system detectors.

U.S. Publication No. 2013/0222575 is directed to a glass bottle inspection apparatus and method that detects a defect on the glass bottle by an imaging process via one or plural illuminating units and at least one camera.

U.S. Publication No. 2009/0148031 is directed to a surface inspection apparatus which scans the surface of an inspection object with an inspection light, receives reflection light from the surface and generates a two-dimensional image of the object surface based on the reflection light. The apparatus classifies pixels in the two-dimensional image into pixels having tones corresponding to defects on the object surface and pixels having tones not corresponding to the defects.

U.S. Publication No. 2004/0065841 is directed to a process and apparatus for testing the coating thickness on a plastic container by shining ultraviolet light through the container to one or more ultraviolet sensors and determining the thickness based on the amount of ultraviolet light passed through the container.

U.S. Pat. No. 6,252,237 is directed to a method for measuring the thickness of a coating on a coated surface, using a solid state array of light-sensitive elements to measure light emitted from a fluorescing coating composition and measuring the intensity of the coating composition.

U.S. Pat. No. 6,646,752 is directed to a method and apparatus for measuring thicknesses of ultra-thin gate oxide layers, by using heat treatment and ellipsometry. Ellipsometry is very sensitive technique and requires high quality layer construction with very little diffused light scattering component being present in the signal. It also requires considerable time for reflected signal acquisition. Due to specific defects and irregularities presented on the bottle surface in FIG. 3, the diffused light component becomes considerable. Therefore, it is unlikely to be used for on-line coating characterization.

U.S. Pat. No. 5,208,645 is directed to a method and apparatus for measuring the thickness of a coating around a cylindrical object, by irradiating the object with parallel rays of light in a direction perpendicular to the specimen length and measuring the peak levels of the light intensity of light refracted from the specimen and received via an image detecting device.

U.S. Pat. No. 5,991,018 is directed to an apparatus for inspecting a thickness or deteriorating situation of a coating layer using an image pickup unit to receive reflected light or transmission light. The image pickup signal is compared to a reference formula to determine the thickness of the coating. The inspecting apparatus may measure the thickness of the coating layer on the production line. This technique is confined for the reflection geometry between 30 and 60 degrees. It also requires an incident light to be condition in certain way to achieve a perfect illuminant properties. It also relies on the presence of the reference beam. It also is limited to the coatings with thickness above 40 nm. For example, the variation of the bi-stimulus values, X and Y represent less than 7.3 and 9% change for the containers having thickness zero and 45 nm, respectively. These small variation are within error of measurements due to complex light scattering by the bottle described in FIG. 3.

Currently practiced optical thickness measurement method, most commonly using meters supplied by American Glass Research (AGR), provides accurate measurement of thin coating thicknesses (e.g., less than about 20 nm), as well as accurately identifying small changes in coating thickness, for static bottles at near ambient temperatures (e.g., <100° C.) using a direct contact measurement approach using index matching fluid. At the same time, accurate determination of the coating thickness at the "hot end" of the system during the in-line production process is also highly desirable, for example, to maintain the coating within a specified tolerance range and to reduce inventory loss.

SUMMARY OF THE INVENTION

The inventors have developed a non-contact technique for measuring coating thickness on moving objects. Aspects of the technique enable accurate coating thickness measurements on curved surfaces at relatively large distances (e.g., >5 cm) from, for example, a bottle surface to an optical detector setup. The technique relies on fast detection of both reflected and transmitted light, recorded from the surface of the moving object (e.g., moving at <1 m/s). Software identifies the position of a bottle on the time frame of a light beam of less than 5 msec. The technique is substantially insensitive to the ambient light normally present inside a manufacturing facilities such as glass container plants. In some instances, the technique enables measurement of thicknesses of hot objects with surface temperatures of 400-600° C.

An aspect of the present invention may be embodied in an apparatus for measuring a thickness of a coating on an object. The apparatus includes at least one light source (101) and several detectors. One to measure a reflected light (103) and one to measure a transmitted light (104). For some of the aspects of the inventions the transmission detector (104) may be omitted. The position of the incident light and detector can be varied over the bottle height as shown in FIG. 5A. At least one light source is configured to direct light (polarized and/or non-polarized toward the object at a predetermined location on the object, such that a portion of the light interacts with the object. The detector collected reflected signal is configured to capture an image having at least one color channel in one dimension (1D) or two dimension (2D) produced by the portion of the light that interacts with the object. The detector that is configured to capture transmitted light is a 1D detector. A measurement device includes at least one wavelength channel. The wavelength channel may be detector designed to measure intensity variations within a narrow wavelength range. For example, a Si fast response detector equipped with a narrow passing band filter (405±10 nm) allows to only capture intensity from the 405±10 nm laser light source. The wavelength width of each wavelength channel may vary depending on the specific implementation of the invention. In an embodiment, a 1D signal or 2D image are directly converted into a thickness measurement for the coatings on a bottle using data averaging strategies that will be understood by one of skill in the art from the description herein.

Another aspect of the present invention may be embodied in a method of measuring a 2D thickness map of a coating on an object. In this embodiment 2D mapping refers to the measurements of thickness variation within a predetermined surface area. Light is directed toward the object at a predetermined location on the object such that a portion of the light interacts with the object. A 2D intensity image, such as generated by Camera having at least one color channel is captured. This intensity image is later converted into a thickness map of the coating within predefined surface area. This approach allows explicitly accessing 2D thickness maps of coating on curved surfaces. This approach can also include using two, three and n wavelength channel detectors to detect light from the object, such as conventional color cameras (3 channel setup) and (n-channel, charge coupled device (CCD) spectrometer.

DESCRIPTION OF THE DRAWINGS

The invention may be understood from the following detailed description when read in connection with the accompanying drawing. It is emphasized that, according to common practice, various features of the drawing may not be drawn to scale. On the contrary, the dimensions of the various features may be arbitrarily expanded or reduced for clarity. Moreover, in the drawing, common numerical references are used to represent like features. Included in the drawing are the following figures:

FIG. 3A is a perfect container cross-section area.

FIG. 3B is a real life container cross-section area illustrating multi-faceted polygon like surfaces of a generic glass bottle.

FIG. 4 is a top down view on a glass conveyer which illustrates an example of variable bottle location along the conveyor.

DETAILED DESCRIPTION

Figure 5A:
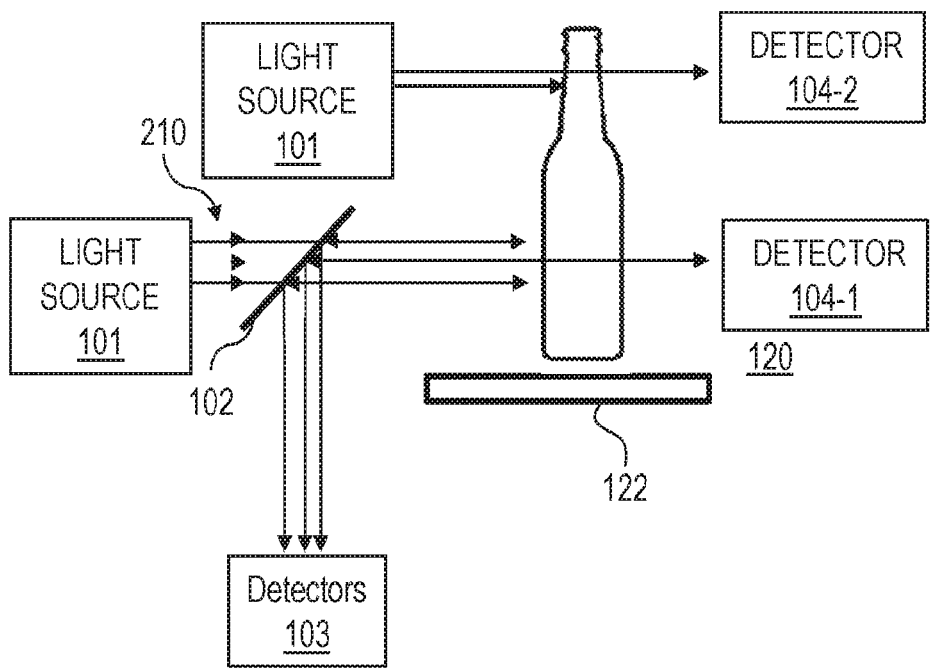
FIG. 5A is an example of partial schematic of the measurement setup for parallel to normal drawn at the cylindrical surface

An exemplary apparatus will be described with reference to the individual figures. FIG. 5A is a functional block diagram illustrating apparatus 100 for measuring a film thickness of a coating on object 120. Apparatus 100 may include at least one light source 101. The light source can be directed at any point along the light of the container object as shown in this drawing. A system may be equipped with 1D detector. A 1D detector is a flat surface element integrating all incident light intensity within its surface without differentiating of the specific light position on the detector surface. Generated integrated intensity signal for the transmitted through the container light spot is measured behind the object. For reflected light, several versions of optical geometry can be utilized using detector (103). In some embodiment of this invention, spatially resolved thickness maps are required, a 2D detector (103) is chosen. A 2D detector is a pixelated surface detector, which differentiates spot intensities depending on their spatial location on the detector surface. This detector can simultaneously collect up to three different wavelength channels in two dimensions. In another embodiment of this invention one or two 1D detectors collecting integrated light intensities are used. Each 1D detector possesses significant sensitivity in a narrow wavelength band. Object 120 may be disposed on conveyor belt 122, and may move past light source 101 at a predetermined speed. Object 120 may include transparent glass and/or colored glass. Object 120 may include a coating disposed thereon, the film thickness of which may be measured by apparatus 100.

Figure 5B:
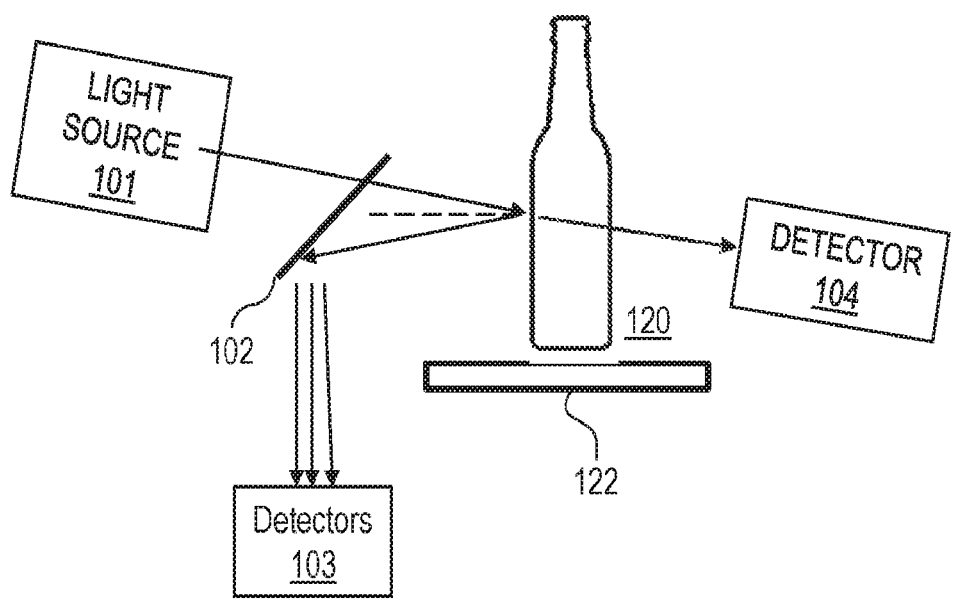
FIG. 5B is an example of partial optical setup for measuring thickness of bottle using small angle light incidence to the normal drawn on the surface of the cylinder.

Polarized and/or non-polarized light source(s) 101 may be configured to generate at least one light beam within visible and/or IR light spectrum. The light beam(s) from light source(s) 101 may be focused and/or directed to interact with object 120 via any suitable optical components (not shown), such as lenses, beam splitters, mirrors, etc. In some examples, the light beam may be directed from light source(s) 101 to pass through object 120, such as measurement light beam using transmission detector 104 shown in FIG. 5A. The angle of incidence can vary from perpendicular to bottle surface (zero degree) to up to, for example, ±20 degrees, as measured from the normal to the cylindrical surface, FIG. 5B. In some examples, the light beam from light source(s) 101 may be configured to be reflected from object 120, such as reflected light beam is directed toward detector 103, FIG. 5A-B. Measurement light beam 101 may be configured to interact with object 120 at predetermined measurement location by scanning the object 120 surface.

Wavelength intensity channel detector 103 may be configured to capture an image having at least one color channels. In this case a one wavelength channel device may be, but not limited to a detector equipped with a filter defining the wavelength sensitivity range of the measured light or a monochromatic camera, as an example of the 2D detector. In some cases, it may consist of at least two wavelength sensitive detectors. In this case reflected light will be separated in different wavelength channels either using dynamic filters or a series of beam splitters and/or dichroic mirrors. In some cases this multi wavelength channel detector may contain more channels, such as 1D or 2D CCD cameras. In some cases, these multi-wavelength channel detectors may be located within a single device, such as a color camera, possessing R, G and B wavelength color channels. In some cases, each of the multiple wavelength channels may be located within separate housing assemblies, such as independent 1D or 2D photo detectors equipped with optical filters. Reflected light image may be produced from interaction of measurement light beam with object 120 at predetermined measurement locations. The color channels may include wavelengths within near UV (315-400 nm), visible (400-700 nm) and/or IR light (>700 nm) spectrum. In one example, the color channels may include three color channels, including red, green and blue color channels. Detector 103 may include, without being limited to, a charge-coupled device (CCD) detector or a complimentary metal-oxide semiconductor (CMOS) detector. In some examples, detector 103 may include a monochrome detector having at least two different color filters disposed thereon, to obtain the at least two color channels in reflected image. In some examples, detector 103 may be configured to simultaneously capture plural images corresponding to plural measurement locations, FIG. 5 A-B. In some examples, two or more detectors 103 may be used to capture multiple images simultaneously, FIG. 5A.

Aspects of the invention relate to apparatus and methods of measuring a thickness of a film coating disposed on an object. The apparatus may include at least one polarized and non-polarized light source, a detector and a measurement device coupled to at least one detector. The light source(s) may be configured to direct non-polarized and/or polarized light toward the object at a predetermined location on the object such that a portion of the light interacts with the object. The portion of the light that interacts with the object is referred to herein as interacting light. As used herein, the term portion of the light includes all of the light or less than all of the light (e.g., a percentage). The detector(s) may be configured to capture intensity of at least one wavelength color channel. Each wavelength channel is sensitive to detect reflected/transmitted light within a narrow wavelength range. A typical example of these wavelength channels are R, G and B color channels with transmittance intensity maxima at 454, 545 and 633 nm, respectively. In certain embodiments of this inventions the wavelength channels are equipped with polarizers that may detect s- and p-polarized light signal. In some examples, at least one wavelength channel includes an 1D (detector) or 2D (monochromatic) camera. A detector is equipped with a non-polarized or polarized optical filter that allows collection of reflected/transmitted light from the coated object within a narrow range of wavelengths defined by the properties of the optical filter. In some examples a multi wavelength channel detector may consist of two 1D detectors or a two wavelength channel camera possessing two selected wavelength ranges, such as R and B as an example. In some cases, the measurement apparatus includes three wavelength channel detector: 1D detectors and conventional color cameras including red, green and blue color channels. The measurement device may determine an average light intensities at each channel and distribution of light intensities in the histogram representation for at least one color channels. The measurement device may determine at the thickness in case of the 1D detector or a 2D thickness map in case of the 2D camera. These measurements will determine an acceptability of the coating on the object based on the determined measurements.

Apparatus 100 may be configured as part of a coating application system having at least one injector as well as an add-on to the system attached to the coating system assembly. For example, light source(s) 101, and detector(s) 103 and 104 may be positioned within a coating system downstream of injectors or immediately after the exit of a coating system. The coating system may be used to apply the protective film coating to hot glass containers via injector(s). Coating system 126 may isolate the glass containers from ambient conditions, and may furnish a controlled coating operation atmosphere. Coating system may include an exhaust system (not shown) which captures most of the air-entrained coating compound not adhering to the containers. The exhaust system may minimize the opportunity for the coating compound to attack building components. Coating system may include components such as blowers, blowing slots and/or suction slots to produce one or more loops of high-velocity air, such that the coating compound is distributed by injector(s), is entrained within an air stream and appropriately directed to object 120 to be coated. A suitable coating system for containers is disclosed in Pat. App. No. PCT/US2013/037520, the content of which is incorporated by reference herein in its entirety.

It is contemplated that apparatus 100 may be configured to connect to a global information network, e.g., the Internet, (not shown) such that the captured intensity, images, and/or thickness analysis results may also be transmitted to a remote location for further processing and/or storage.

Existing inventions possess high noise during thickness measurements. The present invention uses several novel approaches to reduce noise, provide reflected signal to distance independent technique capable of operating in the visible spectrum.

Figure 2:
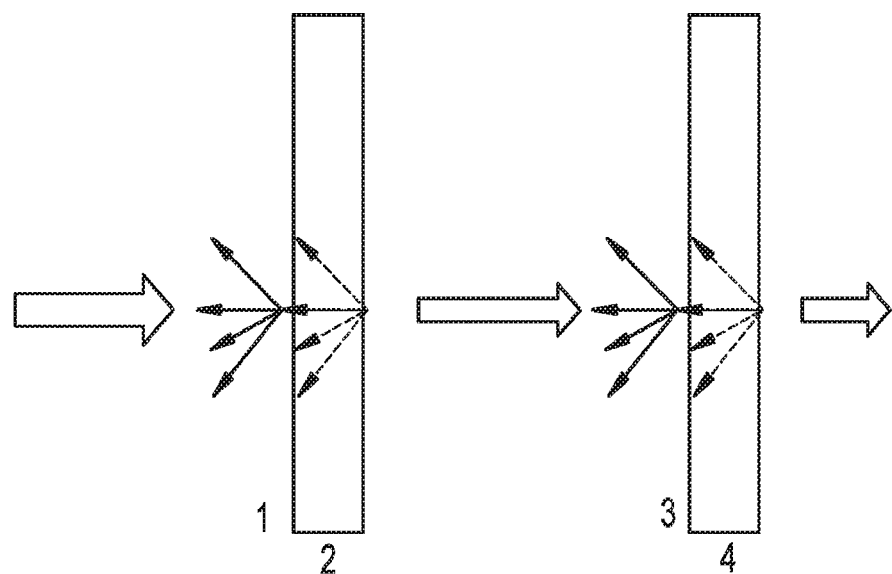
FIG. 2 is a drawing schematic illustrating incident light scattering mechanism at different container surfaces.

In one of the approaches, the noise is reduced by eliminating stray reflections from the signal. As presented in FIG. 2, four main reflections result from the interaction of a light beam with a transparent, 'Flint' glass container. Out of the four reflections, only the first one is related to the thickness of the transparent coating that is being determined at the front of the bottle. Reflections, 2 and 3 represent noise and reflection 4 is related to the coating thickness on the opposite bottle side. For the perfect cylindrical objects these noise associated reflections can be averaged out. However, due to the imperfect cylindrical structure typically found in glass containers, shown as an object cross-section, FIG. 3B, these noise reflections cannot be averaged out and play a considerable role defining difficulty in determining thickness of the coating on the bottle. Specifically, reflections 1-4 due to the outside and inside bottle irregularities and defects are only partially delivered to the detectors. For example, setup presented in FIG. 6 was used to collect light reflected from the cylindrical Flint bottle surface. The collected reflected intensity that is related to coating thickness, comprising all four reflected components, was plotted as a function of coating thickness in FIG. 7 A. Intensities of reflected light increased as a function of coating thickness. However, one observes a considerable level of noise in the measurements due to the presence of all four reflections. The reflected intensity dependence relative to coating thickness was fitted to a straight line with $R^2$ value of 83.6%.

Second, reflected beam blocking techniques described in the invention were introduced. For this setup, reflections 3 and 4 were removed by the optical setup and a sum of reflections 1 and 2 was measured, FIG. 6. Resulting reflected intensity calibration curve as a function of coating thickness is shown in FIG. 7B. The noise of the measurements was dramatically reduced. The reflected intensity dependence was fitted to a second degree polynomial with $R^2$ value of 97.78%. The removal of noise resulted in considerable improvement in detection of coatings with relatively close thickness, ±10 CTU.

Figure 6:
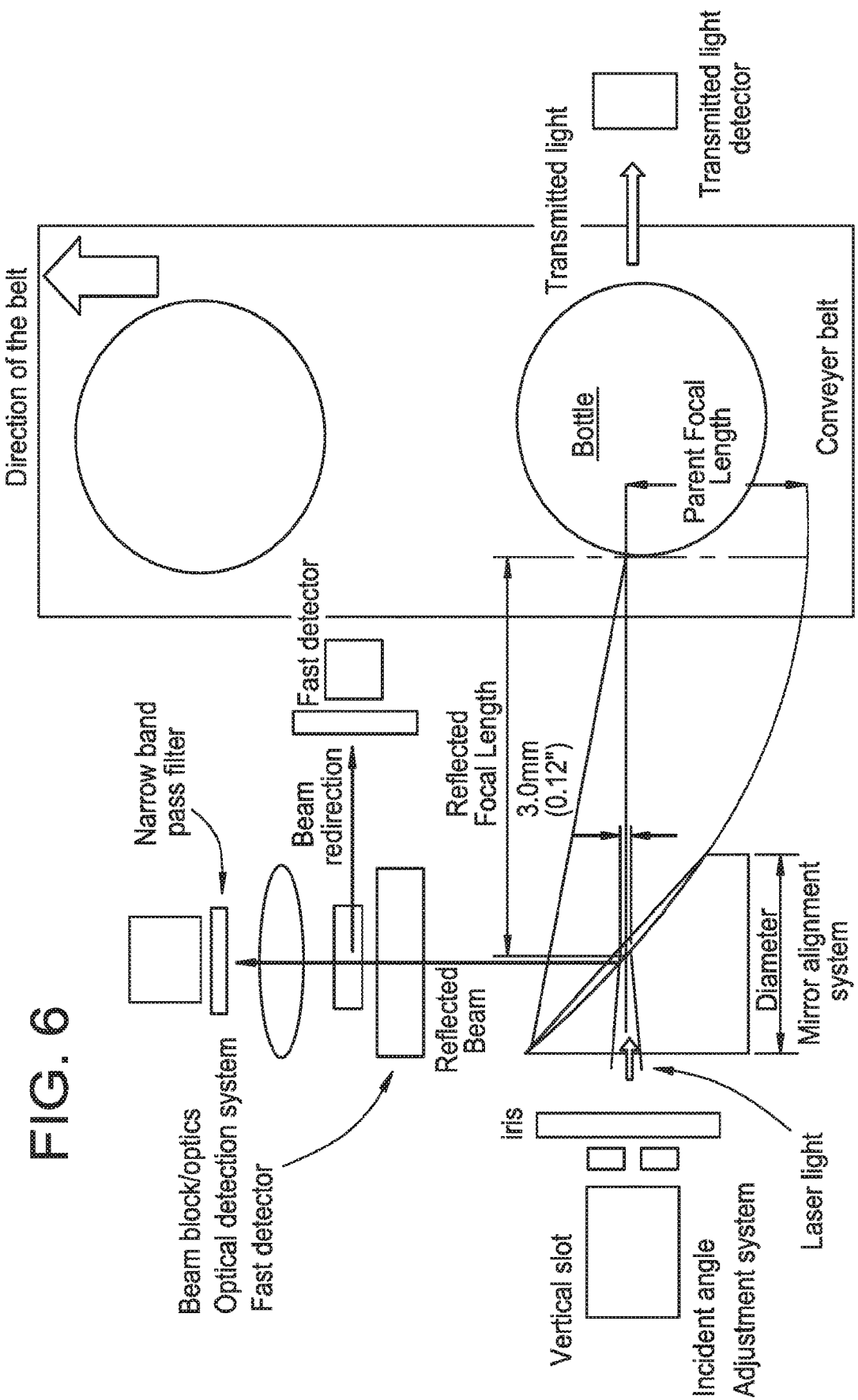
FIG. 6 is a global schematic of the optical setup for measuring thickness of coatings on the bottle surface.
Figure 7A:
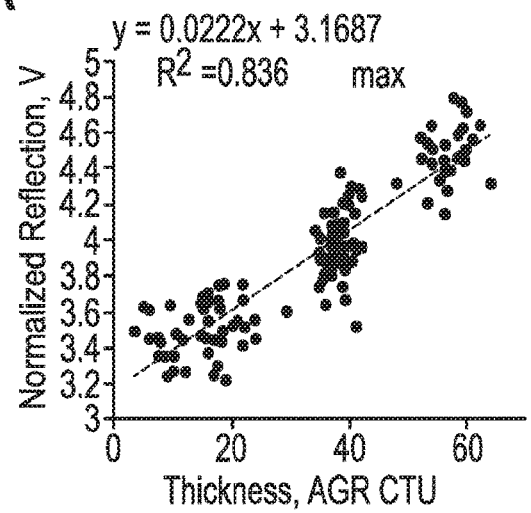
FIG. 7A Intensity of all 4 reflections (FIG. 2) as a function of coating thickness for flint bottle FIG. 7B Intensity of reflections 1 and 2 (FIG. 2) as a function of coating thickness for flint bottle FIG. 7C Intensity of reflection 1 (FIG. 2) as a function of coating thickness for flint bottle.
Figure 7B:
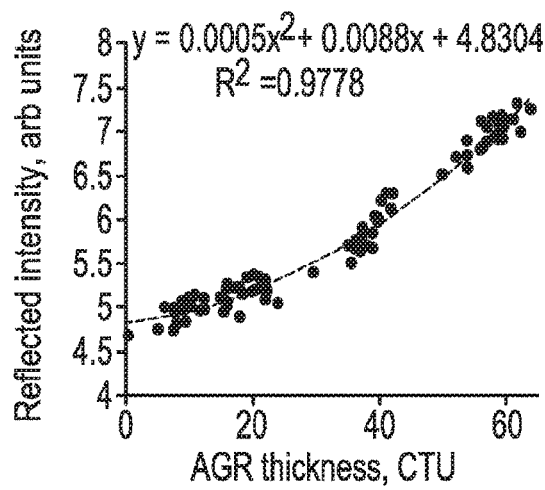
Figure 7C:
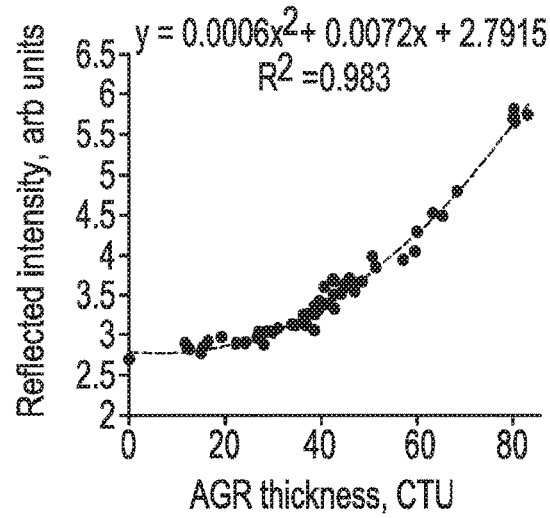

Third, optical component setup presented in FIG. 6 was modified further to eliminate all three noise related reflections, 2-4. The reflected intensity 1 was plotted as a function of coating thickness (FIG. 7C). The reflected intensity was fitted using second degree polynomial. The fitting had a quality of fit of $R^2$=98.3%. Considerable reduction in the noise level readily allowed differentiation between coating thickness of zero and 10 CTU, 10 and 20 CTU, 20 and 30 CTU and others. This high quality of the fit allows determination of thickness of the coating within ±2-5% over the entire studied range.

Figure 1:
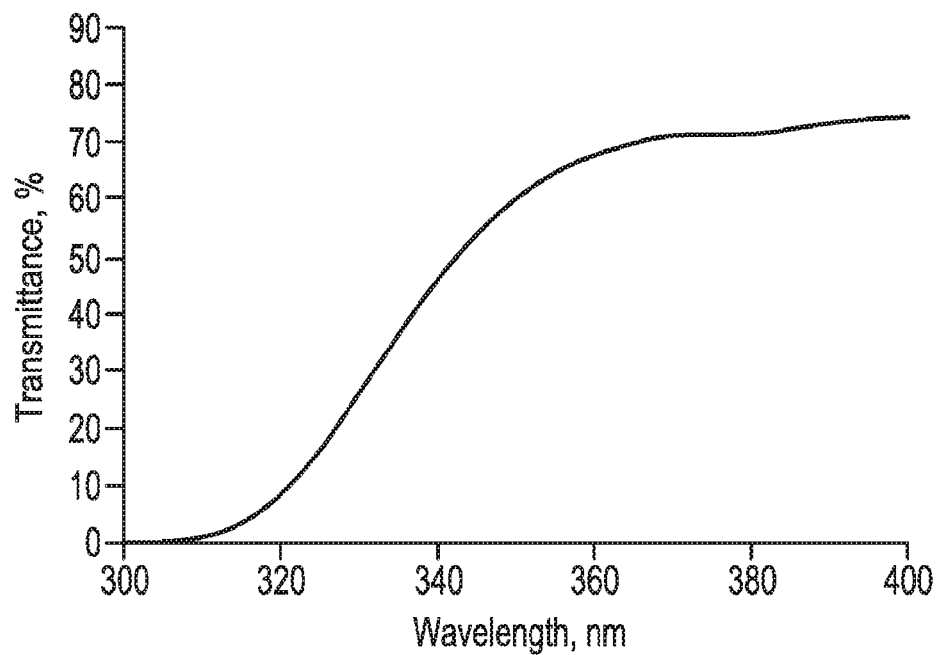
FIG. 1 is a transmission spectrum for flint (transparent), not colored glass bottle

Current invention is focused on reducing error in non-contact thickness measurement. This is accomplished by offering a novel optical design system for removing the noise related reflections. Out of the four potential reflections, only reflection 1 is directly correlated with the transparent oxide thickness, while reflections 2, 3, and 4 represent noise in the system. The noise reduction method may be accomplished without switching the excitation wavelength into UV spectral region. Most of the current inventions address reduction of noise reflections by minimizing the transmission of the incident light through the bottle (FIG. 1). FIG. 1 indicates that this may be achieved by switching to using the UV light due to high absorption of this light wavelength within a bottle. For example, see WO 2004/065902 and US No. 2009039240. In addition to obvious complications and safety concerns arising from using UV at wavelength at or below 320 nm, the choice of the excitation sources and optical lens are limited and expensive. In addition, the sensitivity of most commercial detectors is generally small at wavelengths as low as 320 nm, which leads to additional noise in these systems.

Figure 8A:
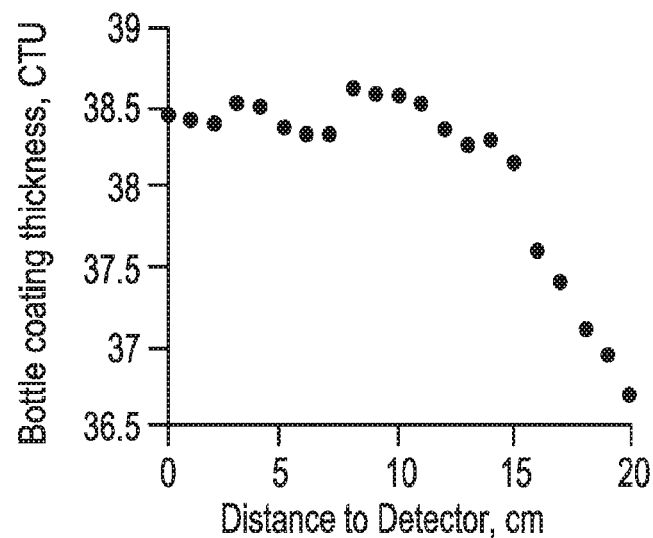
FIG. 8A Measured thickness [CTU] of $SnO_2$ coating as a function of distance between bottle and detector.
Figure 8B:
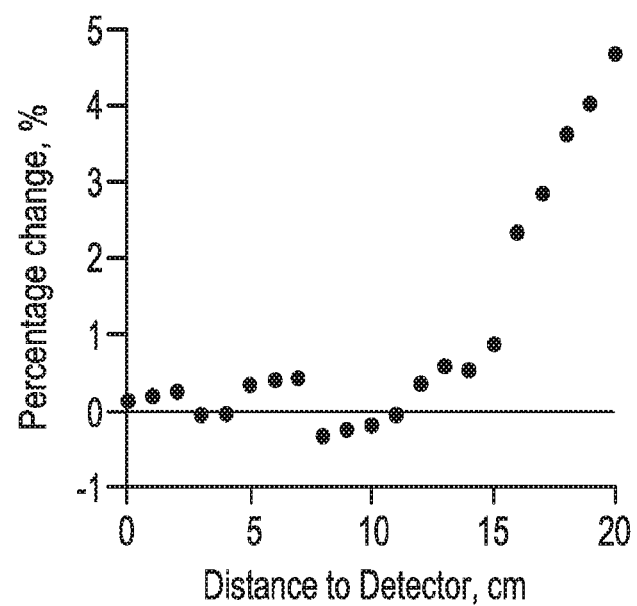
FIG. 8B Percentage change [%] of thickness as a function of distance between bottle and detector.
Figure 11A:
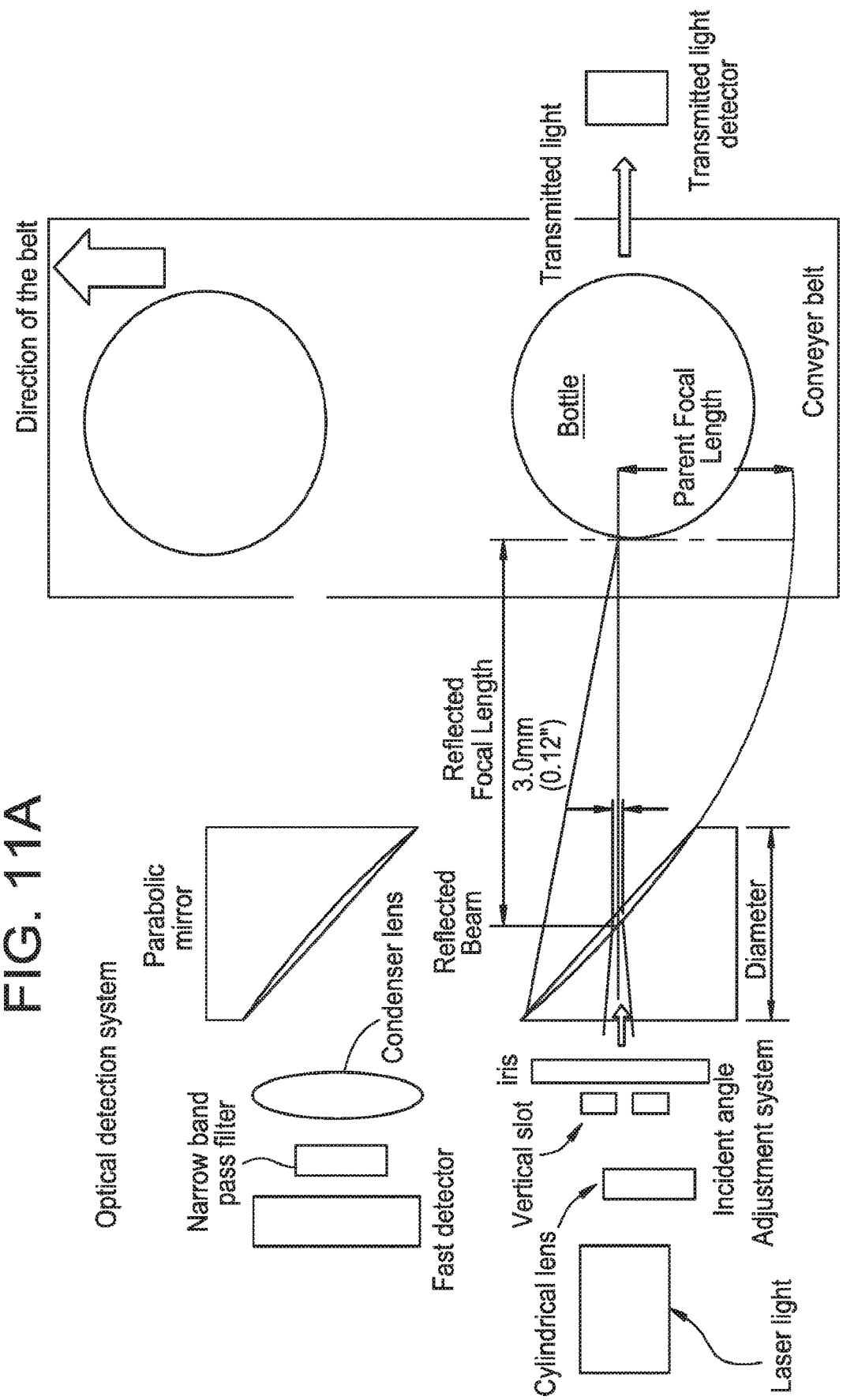
FIG. 11A Schematic of the optical setup

Our invention utilizes a visible wavelength range excitation light source. This light source is inexpensive and is easily available from most of the commercial optics suppliers, for example Thorlabs. Also, most optical elements have anti-reflection coatings with functionality optimized to the visible (400-700 nm) range that are designed to reduce stray reflection to below 0.5%. Without the anti-reflection or with poorly designed coatings, such 400-700 nm anti-reflection components used in UV at 350±50 nm, the stray reflections increase to over 4%, which is comparable to the reflections from the containers that are to be measured. The current invention is designed to separate the multiple possible reflections, FIGS. 7 A-C. Each of the presented techniques is shown for a sake of non-limiting example of an aspect of the full invention. In addition, generally past teachings possess distance dependent signal properties, such that when measured reflected intensity is a decreasing function of distance. This property forces past processes to be placed at close proximity (~5 cm) to the bottle that is prohibited at the actual Bottle glass plant conveyors. The present invention allows to obtain distance independent performance of the reflected signal within a broad distance range from 0 to 30 cm from the bottle. In one specific embodiment of this invention, reflected intensity of the 405 nm laser light was measured as a function of distance from the detector to the bottle. The bottle was placed on a translation stage that allowed to regulate the distance in a setup presented in FIG. 6. The laser light was fed through the whole in an off-axis parabolic mirror (focal distance 4-6 inches). This optical arrangement allows eliminating the "Ghost" signal observed in the past inventions utilizing the beam splitter setup that led to considerable noise. Parabolic mirrors are achromatic and, therefore, are not affected by optical dispersion effects. The off-axis angle of the parabolic lens is 90 degrees that allows for quick and reliable optical alignments. This can be compared to the beam splitter setup (FIG. 5) where reflected signal continues to diverge after the beam splitter. The present design and process allow collimation and convergence of the semi-point light source using the off-axis parabolic mirror. The reflected light coming from the parabolic mirror is collected by a condenser lens (FIG. 6) or a second parabolic mirror (FIG. 11A). Measured intensity was converted to thickness (CTU) of the $SnO_2$ coating, FIG. 8 A. Then, it the thickness was converted to the percentage thickness change in FIG. 8 B. It can be seen from these figures that in this embodiment of this invention, a distance independent measurement operation range was from 0 to 15 cm, where thickness fluctuation were below 1%. It can be further extended to 20 cm, where thickness decreased by 5% between 15 and 20 cm. This is considerable improvement versus the 'Beam Splitter design', (FIG. 5).

Further physical displacement of the measurement system away, in perpendicular direction, from the conveyer belt may allow to avoid temperature shocks to the sensitive, optical and electrical elements of the setup. It also may help to avoid direct contact of the system with the bottles when bottles shift their position on the conveyor (FIG. 4). Despite considerable benefits to our optical design and its improvement over previous designs, due to the divergent nature of the reflected light beam coming from the cylindrical objects, reflected light full collection is limited at above 40 cm.

Figure 9A:
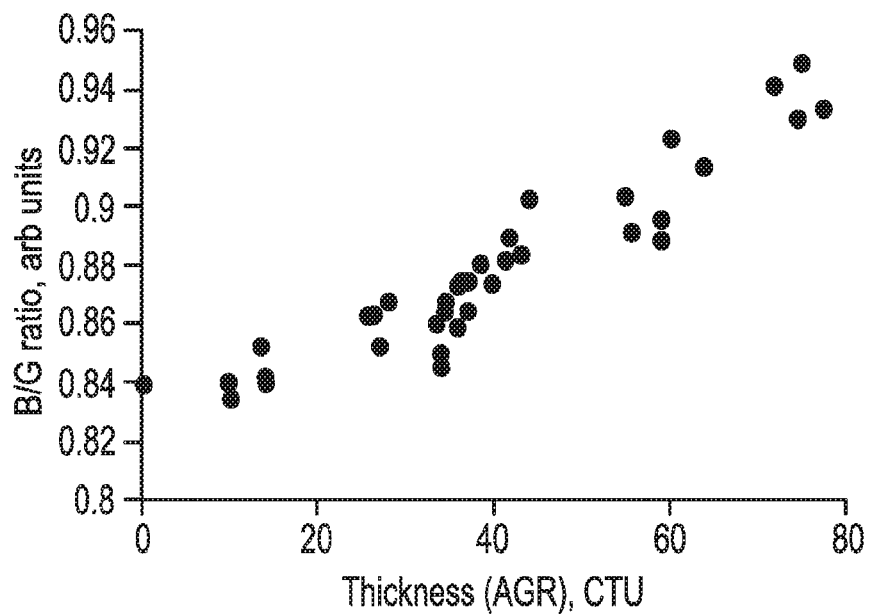
FIG. 9A An example of Blue (456 nm) to Green (556 nm) wavelength channel ratio as a function of the coating thickness as determined by AGR measurement on Amber bottle.
Figure 9B:
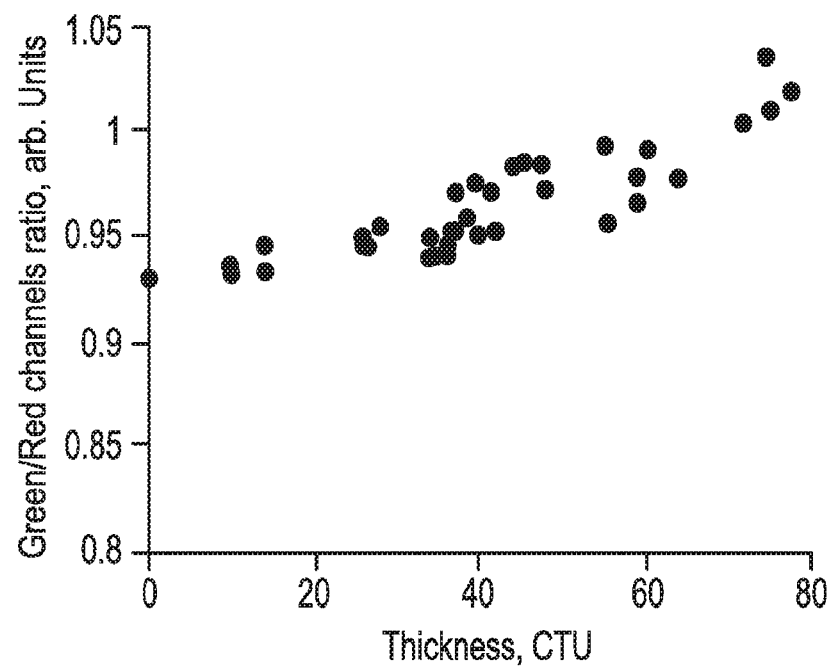
FIG. 9B An example of Green (556 nm) to Red (663 nm) wavelength channel ratio as a function of the coating thickness as determined by AGR measurement on Amber bottle.
Figure 10A:
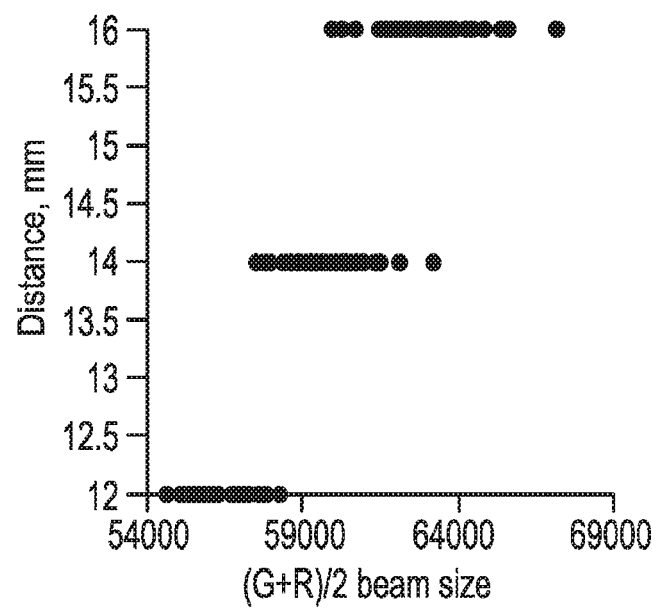
FIG. 10A Distance to the bottle as a function of the (green plus red)/2 beam size FIG. 10B Predicted thickness of the coating as a function of the AGR measured thickness of the coating. Solid lines are showing ±50, ±10 and ±5% error with respect to the straight line fit to data.
Figure 10B:
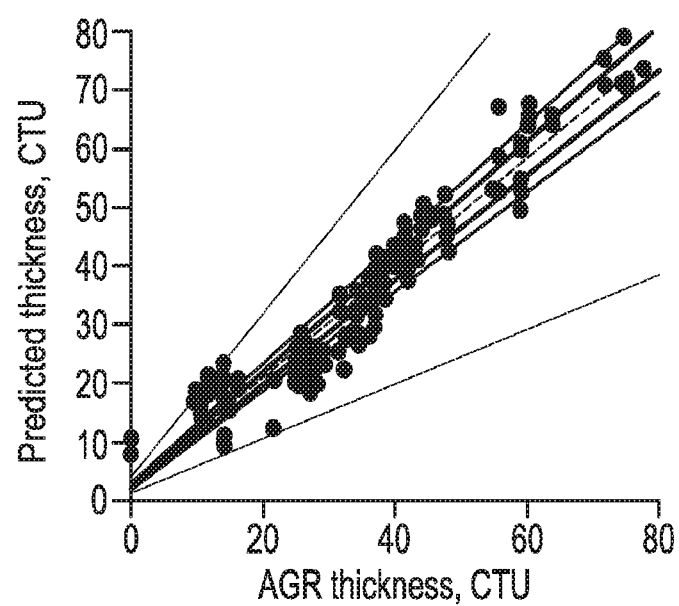

In another aspect of this invention, a novel design and process allow obtaining distance independent bottle coating thicknesses as well as 'Standard free' measurement technique. Current static AGR technique requires using '0' and '27' coatings Standards to calibrate the voltage reading into coating thicknesses. In this embodiment, arithmetic manipulation of the wavelength channel intensities, such as, for example, use of ratios chosen to reduce noise and improve signal-to-noise ratio and develop a distance independent thickness measurement technique are used. For example, ratios of blue to red, green to red and blue to green wavelength channels may be used for measuring thickness of the layer coatings. This invention is independent of the bottle type and therefore, does not require calibration and is related to the thickness of the coatings. It relies on the optical setup described above, FIGS. 5 A-B and 6. Examples of the measured reflected intensity ratios are shown in FIGS. 9 A and 9 B for the blue to green and green to red excitation channels. The excitation light is that for a fiber coupled warm white light source in this case. However, it can also be any other light source previously described. The wavelength channels are defined by the R (peak at 663 nm), G (456 nm) and B (peak at 445 nm) signals obtained using a color camera 3-channel 2D detector system. The indicated ratios increase as a function of thickness, FIG. 9 A-B. Using developed correlations and setup constructions, such as FIG. 5A or FIG. 6, the thickness of the coating is calculated using polynomial algorithm with good degree of correlation (±10%) for most samples, FIG. 10 B. Note that whenever as each reflected intensity for each channel is a decreasing function of distance from the bottle to the detector. The ratio of intensities is constant as a function of distance. Inherited nature of 2D detector in this setup was used to determine the distance of the bottle with respect to the position of the mirror alignment system (FIG. 10 A). This distance is determined by integrating the 2D images of the reflected spot light by 2D detector taken during measurements to obtain an image size. With slightly diverging reflected beam sizes, the beam size on the detector will correlate with distance to the bottle. This as-determined distance from the beam splitter to the bottle may be used to further improve the thickness calculations for the bottle coatings as was done in, FIG. 9B.

Example 1

A light source (101) that may be an LED laser light source (404.6 nm) using a special assembly is directed on the surface of a moving container object. In some instances, it can pass through a beam splitter as shown in FIG. 5A at close to 90 degree angle to the surface of the bottle. In some instances, the laser light can be directed at the container surface at small angle of 0 to 15 degrees to the normal drawn at the container surface with, FIG. 5 B. In some instances of this invention, a detector measuring transmittance of this light is placed behind the container, 104. In some instances, redirection and/or collection optics are used to direct reflected light from the container towards fast detectors. In some cases, the light of a narrow wavelength and/or a series of light sources of narrow wavelength are directed through a hole in a parabolic mirror alignment/collection system, FIG. 6. These light sources may be directed at different angles to the normal of the container surface positioned in front of the light source. Light reflected from the bottle surface is collected by the mirror alignment/collection system and redirected towards beam-blocking and/or beam-redirection optics.

Figure 11B:
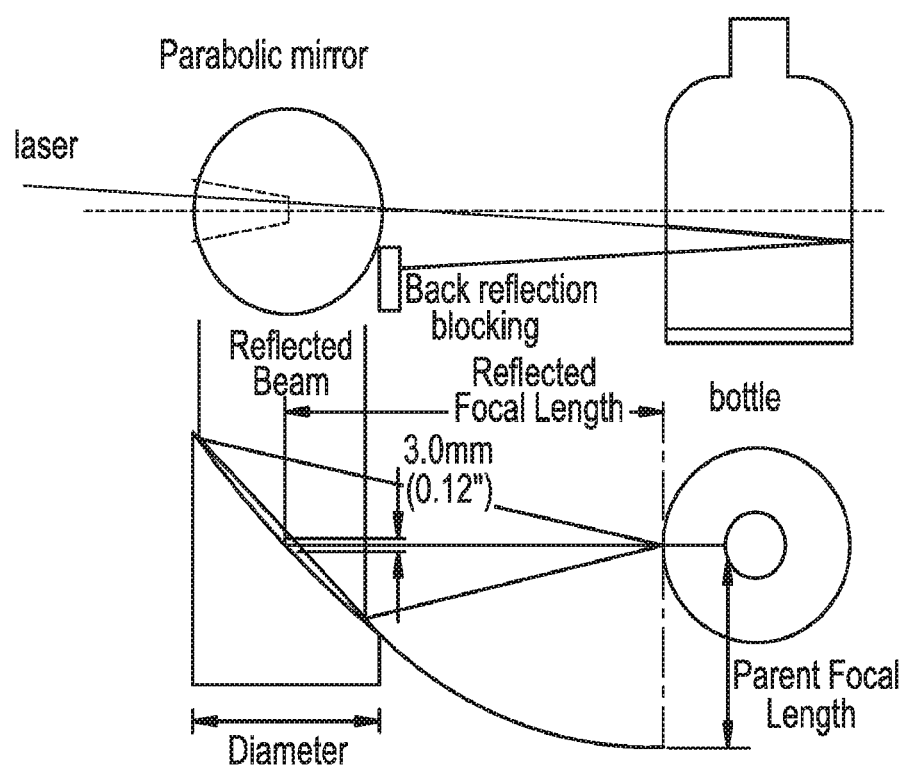
FIG. 11B Magnified part of the optical setup diagram (FIG. 11A) focused on the parabolic mirror and the laser light and bottle interaction area.
Figure 12:
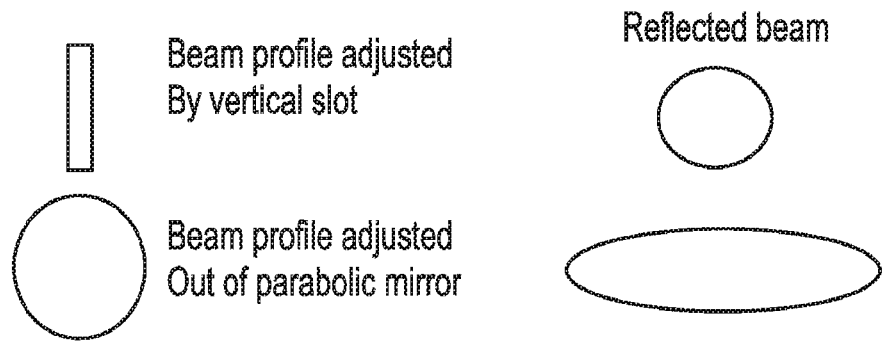
FIG. 12 Schematic of laser spot shape modification by application of the vertical slot before (left) and after (right) being reflected off the cylindrical object. The incident light and reflected light beams are shown.
Figure 13:
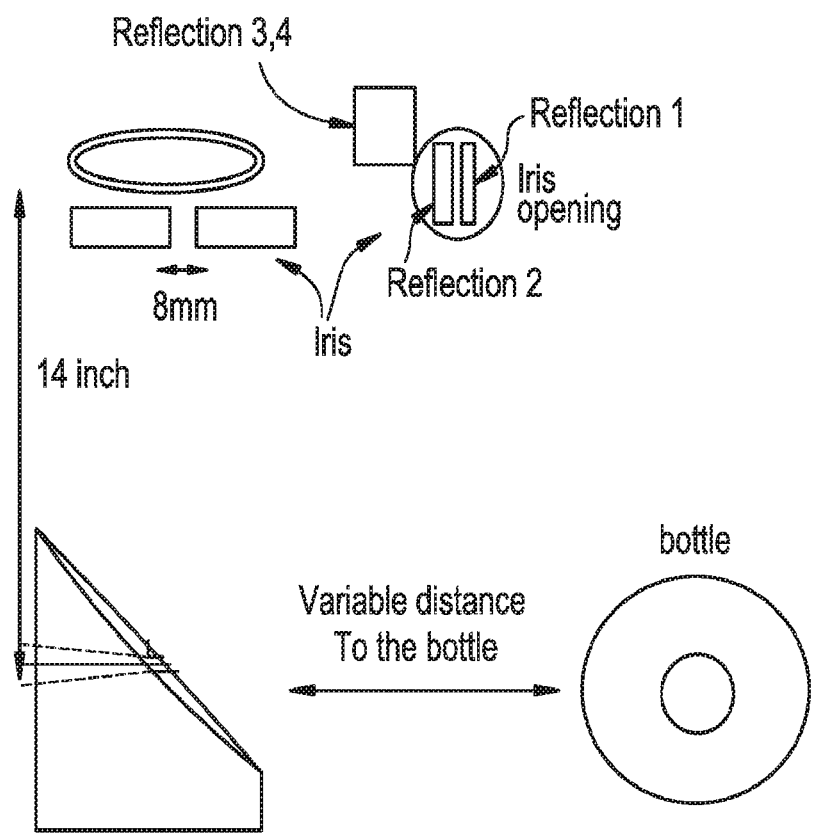
FIG. 13. Area of the optical setup where reflection 3 and 4 blocking occurs.

One of representative schematic is shown in FIG. 11 A. The laser light is designed to enter the hole in the parabolic mirror at a small angle to the normal drawn to the bottle surface, FIG. 11 B. To allow this action, the hole in the mirror has a conical cross-section. This embodiment is not limited by the conical cross-section but also can be defined by the rectangular cross-section that will allow formation of the vertically align light source. The laser light may be modified before entering a whole in the parabolic mirror. The beam may be converted into rectangular shape by passing it through a vertical slot and/or a vertically aligned cylindrical mirror (FIG. 11 A and FIG. 12 showing beam profiles). A set of horizontal slots placed before the parabolic mirror is design to allow reduction of contribution of reflections 3 and 4 (FIG. 2) from the opposite wall of the container before the reflected light striking the mirror (FIG. 11 B). The horizontal slot converts the beam shape to an extended rectangular shape and the iris removes stray reflections of the light caused by interaction of the laser with the hole inside the parabolic mirror, FIG. 11. 90 degree off-axis parabolic mirror is aligned to redirect the reflected light from the horizontal plane of the bottle surface towards the top of the diagram. All 1, 2, 3 and 4 reflections are emitted by the bottle. After horizontal slots mostly reflections 1 and 2 are present with only small contribution from 3 and 4 reflections. Reflection 1 and 2 are redirected by the parabolic mirror towards a light redirection assembly (beam splitter), FIG. 10 A. These assembly allows to sample as-collected reflected light and compare it with the light where removal of the reflections. For example, the total signal collected after this beam splitter (1+2+3+4). After blocking of the reflections, it becomes possible to reconstitute reflection 1 by subtracting reflections 2+3+4 from the total. At the top of the diagram there is an iris that allows almost full separation of the reflected beams 1-2 and 3-4, FIG. 13. Experimental reflections of the flint bottle presented in FIG. 7 were collected by the set up described in FIG. 10A, where the reflection 1+2+3+4 were collected after beam splitter (FIG. 7 A). Reflections 1 and 2 were collected after iris, FIG. 7B. Large improvements of signal to noise ratio was observed in this example.

Figure 14:
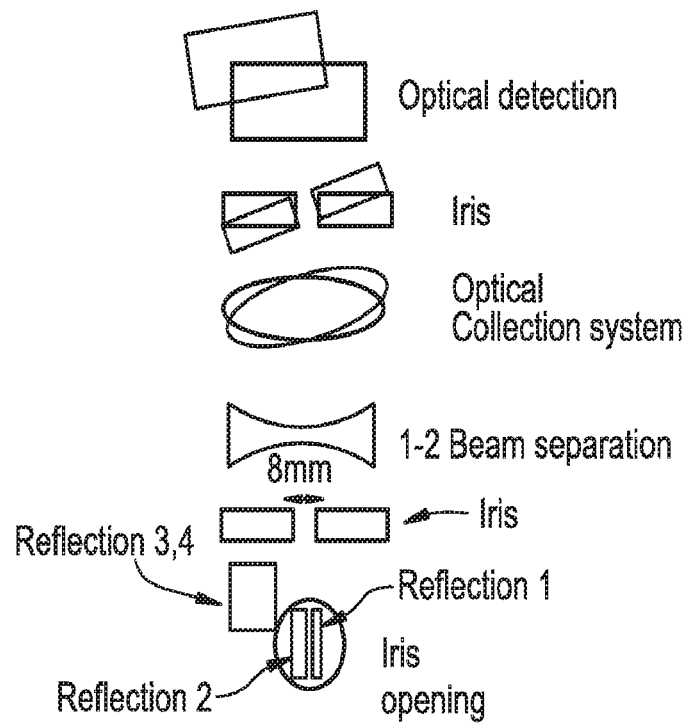
FIG. 14. Magnified schematic diagram for the optical system designed to separate reflected beams 1 and 2 from each other after the iris FIG. 15. An alternative way of blocking the beams 3, 4 are presented.
Figure 15:
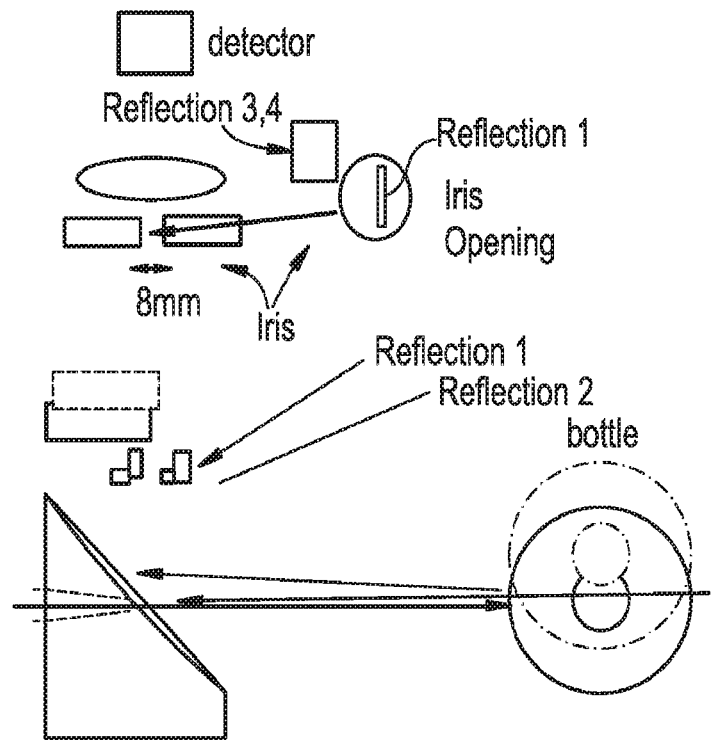

After iris a special optical system allows further separations of reflections 1 and 2 from each other. A schematic block diagram for this process is shown in FIG. 14-15. These separation allows improving the signal to noise ratio further, FIG. 7 C. When the distance of the $1^{st}$ parabolic mirror to the bottle is larger than the focusing distance, the reflected beam converges after the mirror, changing its geometry from ellipsoid with a long horizontal axis into a ellipsoid with a long vertical axis. This optical geometric orientation allows to filter reflections 3 and 4 using vertical slots and an iris, FIGS. 14-15.

Example 2

Using setup similar to that described in Example 1 and without separation of multiple reflections, amber bottles having coating thickness previously measured by standard AGR meter were measured at variable distance from the optical collection/redirection system and the bottle surface. Correlation of the known AGR coating thickness with thickness measured by non-contact detection system of this invention was calculated over two different detector-to-bottle distance ranges. For close detector distance range (7-32 mm) the correlation had $R^2$ value of 98.4%. For farther detector distance range (150-185 mm) the correlation between the two measurements had $R^2$ value of 97.9%. Thus, using current invention similar coating thickness measurement results are readily obtained when detector is up to 20 cm away from bottle as when detector is nearly in contact with container (<1 cm).

Example 3

Several examples of optically calculated coating thickness based on the average intensity of the wavelength channels are presented in FIG. 15 A for reflected light. The data were generated using custom program based on Jones matrix formalism and dispersion parameters of $SnO_2$ coatings on flat soda lime substrates. The thickness of the $SnO_2$ coatings were converted from nanometers into CTU using known conversion relationship (3.45 CTU=1 nm). Four non-polarized wavelength channels are presented in this figure, having peak intensity at 325, 454, 545 and 663 nm were considered. The width for each channel was selected at 1 nm. It is clear that based on the dispersion parameters of the tin dioxide coatings, the intensity of the reflected light increases with the increasing thickness of the coatings, between 0 and 50 CTU. The biggest increased is demonstrated using a 325 nm wavelength channel. For example, maximum to minimum ratios for 325, B, G and R wavelength channels were 3.7, 1.73, 1.38 and 1.24, respectively. These numbers in some cases may represent a figure of merit showing the maximum possible signal ratio for the thickness spread between 0 and 50 CTUs. The higher this number, the less noise will affect the instrumental setup.

Example 4

Figure 16A:
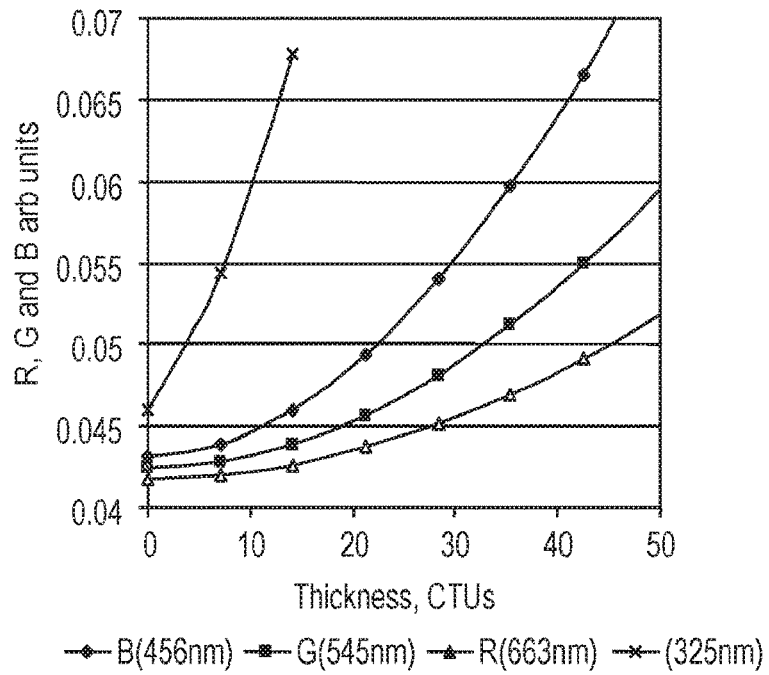
FIG. 16A is a graph illustrating calculated reflectances for 4 wavelength channels centered at 325, 454 (Red), 545 (Green) and 633 (Blue) nm wavelengths, respectively, as a function of $SnO_2$ coating thickness using circular polarized incident light.
Figure 16B:
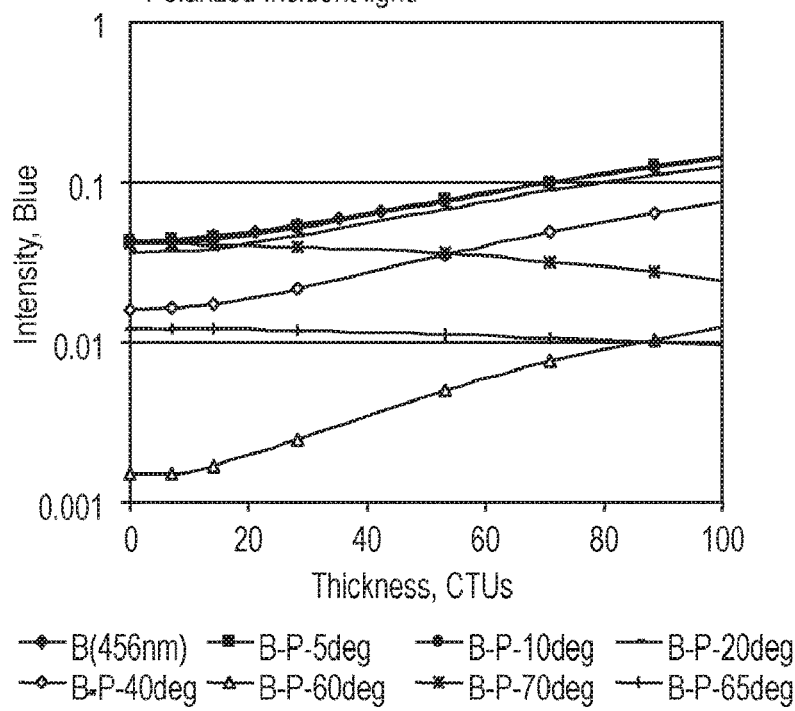
FIG. 16B Calculated Blue (454 nm) wavelength channel intensity as a function of coating thickness in CTU for different angles of incidence using s-polarized light.

In the next example, polarized light was used. It helped improving the figure of merit further. In this example, a setup depicted in FIG. 11 A was used, where the incidence angle of p-polarized was varied from zero to 70 degrees. Reflected light intensities were correlated with coating thickness using similar techniques as in Example 1. The p-polarized light showed a figure of merit of a factor of 9 for the $SnO_2$ coatings having 0-80 CTU thickness range. P-polarized light provided the highest figure of merit for reflection from coatings for the incident angles above 60 degree (FIG. 16 B).

Example 5

Figure 17:
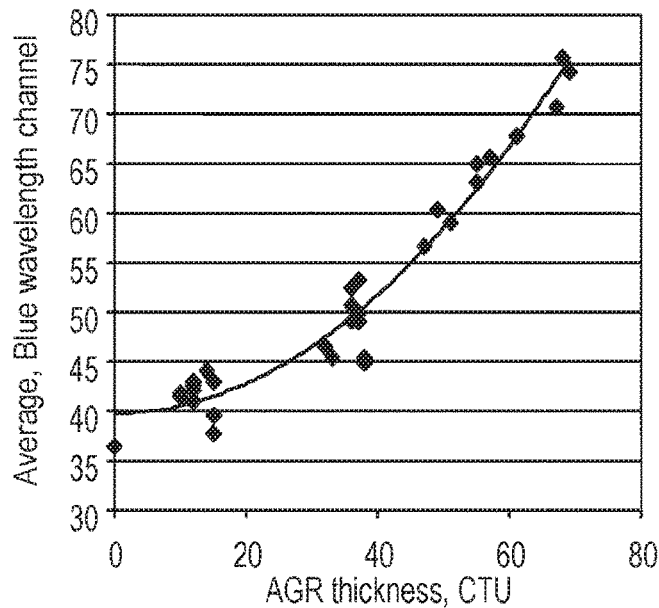
FIG. 17 is a graph illustrating an experimentally determined thickness calibration curve for single (Blue) wavelength channel intensity using a reflection setup for amber bottles (FIG. 6).
Figure 18:
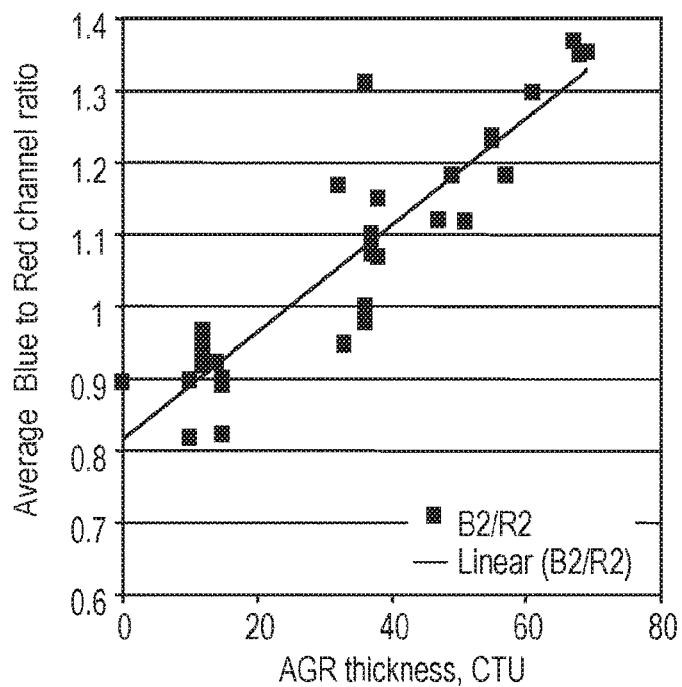
FIG. 18 is a graph illustrating a ratio of blue to red averaged reflected light intensity for amber bottles as a function of $SnO_2$ coating thickness.

In the next example, the intensity of the Blue (454 nm) channel was measured using Reflection set up shown in FIG. 5 A without reflected beam separation. In this experiment, non-polarized (circularly polarized) light was directed through a beam splitter at zero degree angle to the surface of an amber bottle with a diameter of 62 mm. The reflected signal coming from the bottle was directed at 90 degree angle using the beam splitter to a color 2D camera. Bottles having different thickness were characterized and thickness calibration curve was developed. Both theoretical and experimental data agreed well, FIG. 17. In addition to the average intensity measurements for one channel, two wavelength channels were also used. Both Blue and Red (663 nm) wavelength channels were measured on a series of bottles having different thickness of the coatings. An arithmetic ratio of Blue to Red was calculated and is plotted in FIG. 18. A linear increase of the ratio as a function of the coating thickness correlated well with theoretical predictions, FIG. 16 A, as well as results described in Example 1. This experiment based on the intensity ratios was bottle distance independent.

Example 6

Figure 19A:
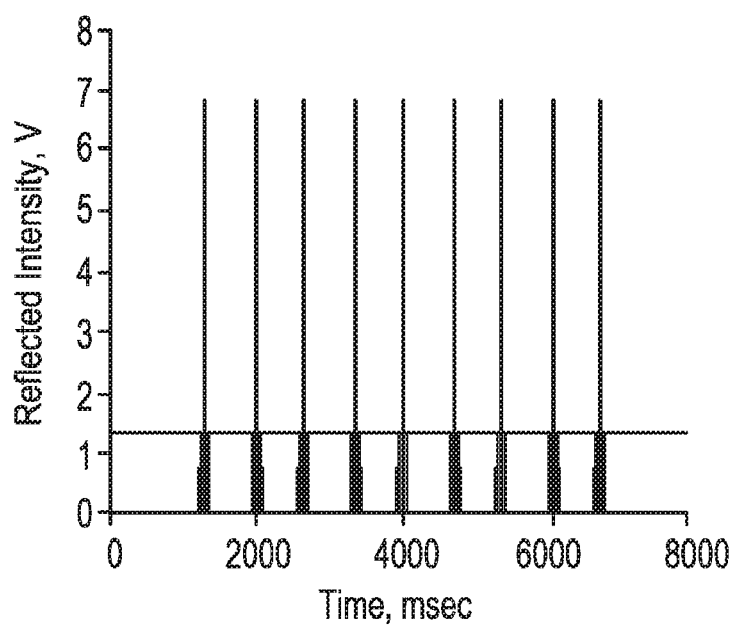
FIG. 19 A-B Time response of the 0.75-1 m/sec moving bottle. Both reflected and transmitted signals are recorded using 'Black" and 'Grey' color schemes.
Figure 19B:
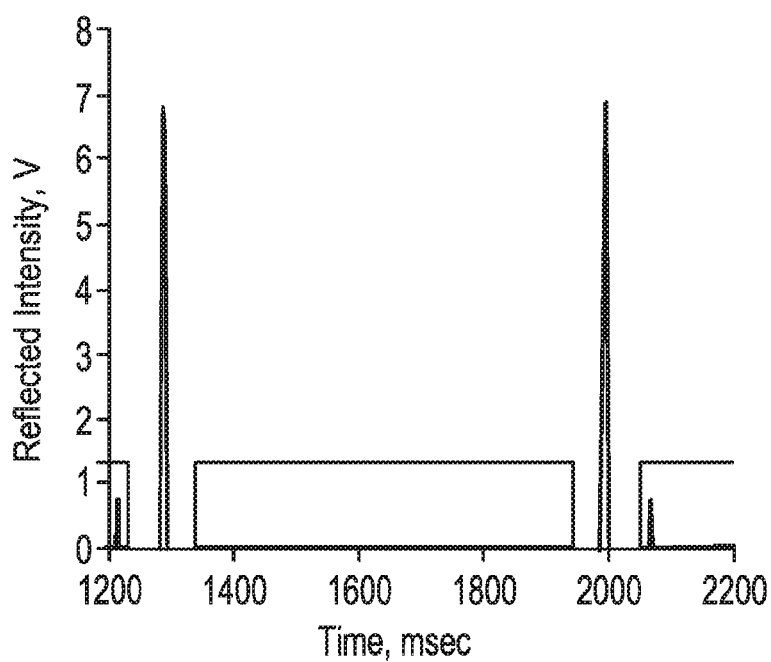
Figure 20:
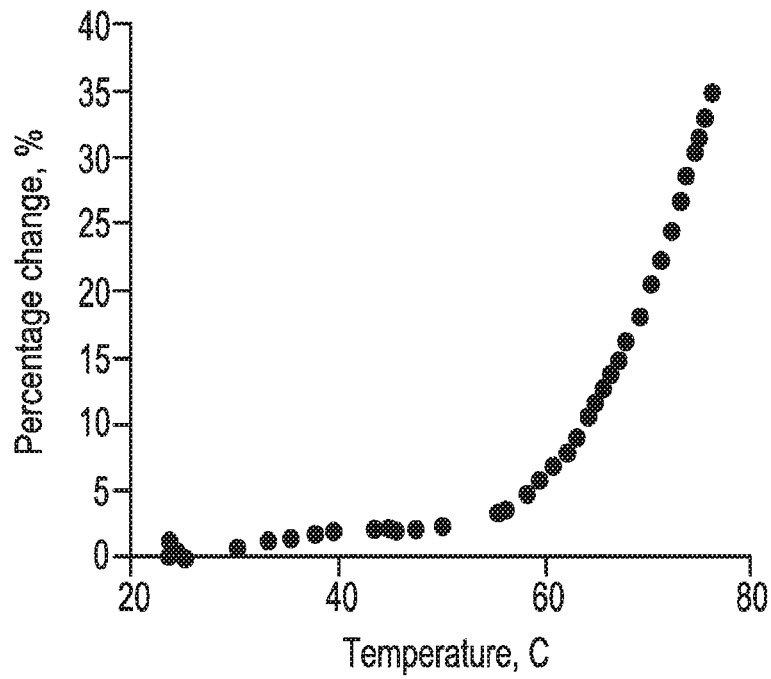
FIG. 20 Percentage change of laser power as a function of laser temperature.
Figure 21:
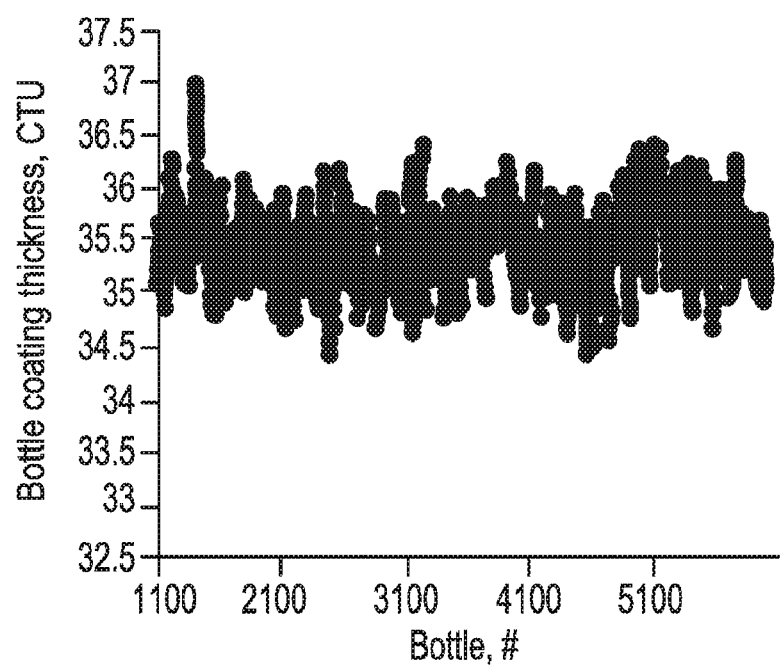
FIG. 21 A sample of the trials at the bottle plant showing calculated coating thickness for ~6000 bottles.

Optical prototype described in detail in FIG. 6 (single parabolic mirror) and FIG. 11 A (double parabolic mirror) was manufactured and tested on a single bottle scanning left to right at speed between 0.75-1 m/s in front of the detector. These speeds are expected to be comparable to the bottle conveyors traveling at ~600 bottles/min. Both reflected and transmitted 405 nm laser light intensities were recorded as a function of time in FIG. 19. Transmitted laser intensity is used as a monitoring mechanism for the incident laser power when bottle is not in front of the detector. A computer program measured modification in the laser power and adjusted the calculated thickness of the coating. This step was important due to considerable variations of the temperature of the laser measured at the Bottle plant line (FIG. 20). We observed up to 35% reduction in laser power when the temperature of the system increased from 25 to 76° C. Maximum value of the reflected peak intensity (FIG. 19) corrected for incident laser power (FIG. 20) were used to recalculate the coating thickness in CTU for a specific bottle. Using this approach, thickness of the $SnO_2$ coating for Amber bottles was recorded on line for the conveyor delivering 630 bottles/min at the actual bottle glass plant. The thickness of over 100,000 bottles were recorded during the trials. A 6,000 bottle sample of this study is shown in FIG. 21. Some fluctuation of the bottle thickness were observed. Some of the noisy data were removed by observing the peak width of the signal (FIG. 19). Peaks outside a specific width were removed using a computer algorithm to obtain a tight data points with an average around 35.5±0.5 CTU (FIG. 21). In addition to the time-width peak correction, some of the stray reflections were removed by setting the maximum peak intensity threshold value above a maximum value for the bottle with now coating. These approaches help to improve signal to noise ratio for the optical system.

What is claimed is:

1. An apparatus for measuring a thickness of a coating on a moving object, the apparatus comprising:
   at least one light source configured to direct light substantially perpendicularly toward the moving object at a predetermined location on the object, a portion of the light interacting with the object;
   a wavelength detector configured to capture an intensity signal comprising at least one channel produced by the portion of the light interacting with the object; and
   a measurement device coupled to the wavelength detector configured to:
      determine intensities of light of the at least one channel based on an average maximum peak intensity captured by each channel of the at least one channel, wherein, for each channel, the average maximum peak intensity is an average of multiple maxima wavelength channel intensities taken along a peak of the channel; and
      determine at least one of the thickness or an acceptability of the coating on the object based on the determined intensities,
   wherein the apparatus is configured to measure the thickness of the coating on the object when the object is positioned at various distances from the light source and the wavelength detector.

2. The apparatus of claim 1, further comprising a display configured to display at least one of the determined thickness, thickness maps, an indication that the determined thickness is acceptable, or an indication the determined thickness is not acceptable.

3. The apparatus of claim 1, wherein the portion of the light interacting with the object includes at least one of the portion of the light passing through the object or the portion of the light reflected from the object.

4. The apparatus of claim 1, further comprising: a controller coupled to the light source, the wavelength detector, and the measurement device, the controller configured to control the light source, the wavelength detector, and the measurement device, such that the measurement device determines a plurality of relative wavelength intensities from respective plural one dimensional (1D) or two dimensional (2D) maps corresponding to plural locations on the object, wherein the measurement device determines the thickness of the coating on the object based on the average maximum wavelength intensities from the plurality of relative wavelength channel intensities, and the plural 1D or 2D intensity maps corresponding to the plural locations are captured sequentially, simultaneously or a combination thereof.

5. The apparatus of claim 1, wherein the thickness of the coating on the object is determined based on a predetermined relationship between the determined relative maxima wavelength channel intensities and coating thickness.

6. The apparatus of claim 1, wherein the light source is configured to transmit within a predetermined wavelength range including at least one of visible light or infrared light.

7. The apparatus of claim 1, further comprising a position sensor configured to detect that the object is at the predetermined location by measuring the size of the reflected light spot on the surface of the 2D detector.

8. The apparatus of claim 1, wherein the apparatus further comprises (i) a parabolic mirror arranged between the light source and the object and having an opening at its center to allow an incident beam to pass through the parabolic mirror, (ii) vertical slots arranged between the light source and the parabolic mirror to modify a spot of the light source to achieve a semi-rectangular shape having a long axis aligned vertically before passing through the opening in the parabolic mirror, the vertical slots blocking off reflected noise related reflections, the parabolic mirror being configured to collect reflected light coming from the moving object and direct the reflected light substantially 90 degrees towards detecting optics formed by either a condenser lens and/or a second parabolic mirror in a combination with a condenser lens.

9. The apparatus of claim 1, wherein the apparatus further comprises a coating hood.

10. The apparatus of claim 1, wherein a material of the coating is selected from a group consisting of metal oxides, titanium oxides, tin oxides, and mixtures thereof.

11. The apparatus of claim 1, which is configured to be at or substantially adjacent to a hot end of a coating system of a glass bottle forming apparatus.

12. The apparatus of claim 1, wherein the object is a glass bottle, and the apparatus forms part of an in-line system for measuring coating thickness on the glass bottle during a glass bottle production process without requiring removal of the glass bottle from a production line for the glass bottle.

13. The apparatus of claim 1, wherein the apparatus further comprises a parabolic mirror arranged between the light source and the object, the parabolic mirror having an opening that is configured to direct light from the light source onto the object, and the parabolic mirror further being configured to collect reflected light coming from the object.

14. The apparatus of claim 13, wherein the object is positioned on a conveyor belt that moves along a belt travel axis, and the light source directs light toward the object along a light path axis that is orthogonal to the belt travel axis, and wherein the parabolic mirror is arranged along the light path axis.

15. The apparatus of claim 13, wherein the parabolic mirror is configured direct the reflected light substantially 90 degrees towards the wavelength detector.

16. The apparatus of claim 13, wherein the object is positioned on a conveyor belt that moves along a belt travel axis, and the light source directs light toward the object along a light path axis that is orthogonal to the belt travel axis.

17. An apparatus for measuring a thickness of a coating on an object, the apparatus comprising:
  at least one light source configured to direct light substantially perpendicularly toward the object at a predetermined location on the object, a portion of the light interacting with the object;
  a wavelength detector configured to capture an intensity signal comprising at least one channel produced by the portion of the light interacting with the object; and
  a measurement device coupled to the wavelength detector configured to:
    determine intensities of light of the at least one channel based on an average maximum peak intensity captured by each channel of the at least one channel, wherein, for each channel, the average maximum peak intensity is an average of multiple maxima wavelength channel intensities taken along a peak of the channel; and
    determine at least one of the thickness or an acceptability of the coating on the object based on the determined intensities,
  wherein the apparatus is configured to measure the thickness of the coating on the object when the object is positioned at various distances from the light source and the wavelength detector.

18. The apparatus of claim 17, wherein the apparatus further comprises a parabolic mirror arranged between the light source and the object, the parabolic mirror having an opening that is configured to direct light from the light source onto the object, and the parabolic mirror further being configured to collect reflected light coming from the object.

* * * * *